United States Patent
Bovyn et al.

(10) Patent No.: US 10,907,504 B2
(45) Date of Patent: Feb. 2, 2021

(54) STRUCTURAL CASING FOR AN AXIAL TURBINE ENGINE

(71) Applicant: SAFRAN AERO BOOSTERS SA, Herstal (BE)

(72) Inventors: Ludovic Bovyn, Tihange (BE); Eric Englebert, Amay (BE); Maxime Peeters, Ben-Ahin (BE)

(73) Assignee: SAFRAN AERO BOOSTERS SA, Herstal (BE)

(*) Notice: Subject to any disclaimer, the term of this patent is extended or adjusted under 35 U.S.C. 154(b) by 79 days.

(21) Appl. No.: 16/263,958

(22) Filed: Jan. 31, 2019

(65) Prior Publication Data
US 2019/0242271 A1 Aug. 8, 2019

(30) Foreign Application Priority Data
Feb. 2, 2018 (BE) .................................. 2018/5063

(51) Int. Cl.
*F01D 25/24* (2006.01)
*F01D 9/04* (2006.01)
*F01D 25/28* (2006.01)

(52) U.S. Cl.
CPC ............ *F01D 25/24* (2013.01); *F01D 9/041* (2013.01); *F01D 9/042* (2013.01); *F01D 25/243* (2013.01); *F01D 25/28* (2013.01); F05D 2230/232 (2013.01); F05D 2230/60 (2013.01); F05D 2240/12 (2013.01); F05D 2240/14 (2013.01); F05D 2250/52 (2013.01)

(58) Field of Classification Search
CPC ........ F01D 25/24; F01D 25/28; F01D 25/243; F05D 2240/14; F02C 7/20
See application file for complete search history.

(56) References Cited

U.S. PATENT DOCUMENTS

| | | | | |
|---|---|---|---|---|
| 3,830,058 A | * | 8/1974 | Ainsworth | F02C 7/20 60/226.1 |
| 6,358,001 B1 | * | 3/2002 | Bosel | F01D 25/162 411/178 |
| 8,794,912 B2 | * | 8/2014 | Nilsson | F02C 7/20 415/191 |
| 9,631,517 B2 | * | 4/2017 | Liles | F01D 25/162 |
| 9,784,133 B2 | * | 10/2017 | Karafillis | F01D 25/162 |
| 2007/0241257 A1 | | 10/2007 | Eleftheriou et al. | |
| 2015/0204212 A1 | * | 7/2015 | Mountz | F01D 21/045 415/144 |
| 2018/0216493 A1 | * | 8/2018 | Moniz | F01D 9/041 |

FOREIGN PATENT DOCUMENTS

| | | |
|---|---|---|
| EP | 2565400 A2 | 3/2013 |
| EP | 2957730 A1 | 12/2015 |
| WO | 2004083605 A1 | 9/2004 |

OTHER PUBLICATIONS

Search Report dated Sep. 21, 2018 for BE 201805063.

* cited by examiner

*Primary Examiner* — Ninh H. Nguyen
(74) *Attorney, Agent, or Firm* — James E. Walton

(57) ABSTRACT

A structural casing for an axial turbine engine includes an outer ring, an inner hub, and a plurality of struts extending radially from the hub to the ring, wherein the ring is made of a plurality of angular segments welded together. The segments extend circumferentially of different angles, some segments being larger angularly than others. The structural casing is adapted to be an intermediate casing between two compressors of a turbine engine.

20 Claims, 4 Drawing Sheets

STRUCTURAL CASING FOR AN AXIAL TURBINE ENGINE

This application claims priority under 35 U.S.C. § 119 to Belgium Patent Application No. 2018/5063, filed 2 Feb. 2018, titled "Structural Casing for an Axial Turbine Engine," which is incorporated herein by reference for all purposes.

BACKGROUND

1. Field of the Application

The present application relates to a casing for an axial turbomachine. More specifically, the present application relates to a turbomachine structural casing and in particular a compressor structural casing.

2. Description of Related Art

An axial turbomachine compressor casing may comprise a structural casing consisting essentially of an outer ring, an inner hub and so-called "struts" struts, extending radially between the hub and the ring. The structural casing is generally in the form of a one-piece casted part. In case of manufacturing defect, it is the entire part that must be discarded, and this can be very expensive.

The document WO 2004/083605 A1 discloses a turbomachine stator. The stator is made of a plurality of identical angular segments, assembled and welded together. Each angular segment comprises an outer ring portion, an inner hub portion and two half-struts. It is only by assembling two adjacent angular segments that the struts are formed. The leading edge of the strut is thus formed of a weld bead, which does not have a perfectly controlled geometry. The efficiency of the stator is therefore not optimal. Also, this requires a complex welding process, with subsequent material deposition. Finally, from a logistical point of view, identical angular segments will be more suitable for being made by one and only one manufacturer or subcontractor, which in terms of supply is not very flexible.

Although great strides have been made in the area of casings for turbomachine compressors, many shortcomings remain.

DETAILED DESCRIPTION OF THE PREFERRED EMBODIMENT

Figure 1:
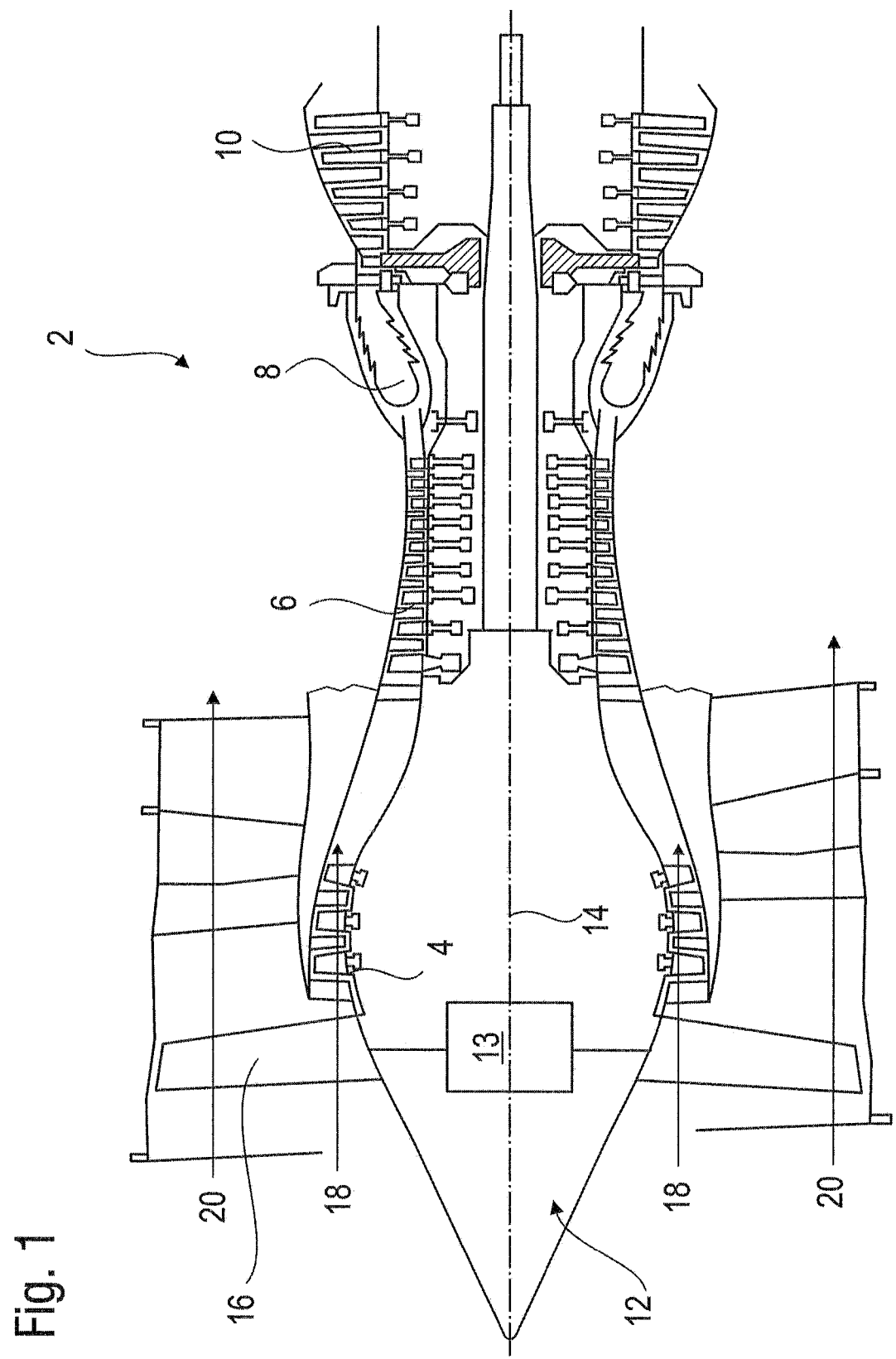
FIG. 1 represents an axial turbomachine according to the present application.

The present application aims to solve at least one of the problems posed by the prior art. More specifically, the present application aims to increase the efficiency of the turbomachine, to simplify the assembly of the structural casing and to propose a design that frees from manufacturing constraints by not restricting the assembly to parts that are perfectly identical.

The present application relates to a structural casing for an axial turbomachine, in particular for an aircraft turbojet, the casing comprising: an outer ring; an inner hub possibly monobloc; and a plurality of struts extending radially from the inner hub to the outer ring, wherein the outer ring is made of a plurality of angular segments welded together in pairs and possibly radially welded to the struts.

The structural casing forms a bearing structure of the turbine engine.

According to an advantageous embodiment of the present application, at least two of the angular segments extend over different angles, one of the angular segments preferably describing an angle at least twice, three times or four times greater than another of the angular segments.

Thus, seen from the axis of the ring the angles according to which each segment extends, may be different.

According to an advantageous embodiment of the present application, the casing comprises at least five angular segments, at least three large angular segments arcing an angle between 80° and 100°, preferably 90° and at least two small angular segments arcing an angle between 30° and 60°, preferably 45°. Alternatively, the housing may comprise at least three or at least four segments, at least one of which arcs an angle strictly greater than 120° or 90° respectively.

According to an advantageous embodiment of the present application, at least one of the at least three large angular segments is interposed between two of the at least two small angular segments.

According to an advantageous embodiment of the present application, the housing comprises attachment rings intended to be fixed to an aircraft pylon, the attachment rings being provided on the angular segments of largest angles and/or the smallest angular segment is devoid of attachment rings.

According to an advantageous embodiment of the present application, at least two, preferably three angular segments are made of different materials.

According to an advantageous embodiment of the present application, each strut comprises an inner end welded to the inner hub, and an outer end welded to the outer ring.

These welding processes are easily identifiable on the outer ring.

According to an advantageous embodiment of the present application, the casing comprises fastening flanges integrally formed with the angular segments. These flanges can be upstream or downstream, and intended for attachment to a low-pressure compressor (upstream) or high-pressure (downstream). The flanges may comprise a radial portion receiving fastening means such as screws and an annular portion provided with holes for axles of variable-stator blades.

According to an advantageous embodiment of the present application, the inner hub is monobloc/or each strut is hollow and monobloc, and/or each strut is integral with an angular segment.

According to an advantageous embodiment of the present application, the inner hub is formed of an assembly of several angular parts, the contact surfaces of two adjacent angular parts defining joint planes. At least one of the joint planes of the contact surfaces of the hub is angularly offset with respect to each joint plane defined by the welds between the angular segments of the outer ring.

Alternatively, the angular parts of the hub may be aligned angularly with the segments of the ring by extending over similar angles. The joint planes between two segments or between two parts may be coplanar and aligned along a radius of the casing. Alternatively, at least one or all of the joint planes can be distinct.

According to an advantageous embodiment of the present application, the hub has an outer surface, preferably substantially conical, on which are arranged recesses to which the struts are welded.

An embodiment may also relate to a kit for assembling a structural casing, the kit comprising a plurality of outer ring angular segments, an inner hub and struts.

The present application also relates to an axial turbomachine with a low-pressure compressor, a high-pressure compressor and an intermediate vein between the low-pressure compressor and the high-pressure compressor, wherein the intermediate vein comprises a structural casing according to one of the embodiments described above.

According to an advantageous embodiment of the present application, each strut is longer axially than high radially, for example at least twice longer.

The present application also relates to a structural casing for an axial turbomachine, in particular a fan support casing for an aircraft turbojet engine, the casing comprising: an outer ring; an inner hub; and an annular row of struts radially connecting the inner hub and the outer ring, wherein the outer ring comprises angular segments and angular welds angularly connecting each angular segment to its adjacent angular segments so as to form a loop around the inner hub.

According to an advantageous embodiment of the present application, the casing comprises radial welds at each radial end of the struts.

The present application also relates to an axial turbomachine with a high-pressure turbine, a low-pressure turbine and an intermediate vein between the high-pressure turbine and the low-pressure turbine, remarkable in that the intermediate vein comprises a structural casing according to one of the embodiments described above.

The present application also relates to a method of assembling a structural housing comprising a step of joining by welding angular segments, remarkable in that the angular segments form an outer ring of a casing according to one of the embodiments outlined above.

According to an advantageous embodiment of the present application, the method comprises a step of assembling the inner hub to each of the struts and a step of assembling each of the struts to an angular segment.

According to an advantageous embodiment of the present application, all the struts are assembled to the hub then each strut is assembled to an angular segment, the angular segments being already assembled together before the struts are assembled.

According to an advantageous embodiment of the present application, all the struts are assembled to the hub then each strut is assembled to an angular segment, and then the angular segments are assembled together.

According to an advantageous embodiment of the present application, the inner hub is formed of several angular parts and one or more struts is/are assembled (s) to an angular part of the inner hub on the one hand and to an angular segment of the ring on the other hand, then the angular parts of the hub and the angular segments of the outer ring are assembled together respectively.

According to an advantageous embodiment of the present application, at least two of the angular segments are manufactured at least in part by two different manufacturing processes, in particular additive manufacturing or casting.

Thus, some of the angular segments may be made of a given material, manufactured in a first method, while some other segments are formed by another method.

According to an advantageous embodiment of the present application, the method comprises, prior to the step of assembling the outer ring, a step of selecting, from a stock, at least two segments extending over two different angles, the sum of the angles of the selected segments being 360°.

The presence of segments of different sizes makes it possible in particular to optimize the size of the parts and to compromise the risk that they may be outside the dimensional tolerances. Thus, some segments can be made by some known methods to be less precise than others. Smaller parts will therefore be made by certain processes with less statistical accuracy in the dimensional tolerances so that the losses are limited in case of rejection. It is also possible to entrust different subcontractors with the load of the manufacture of certain parts and thus to entrust the most reliable manufacturers with larger pieces. All this is not possible if the outer ring is monobloc, or if the casing comprises modules wherein each module comprises a portion of the outer ring and a portion of the hub or struts as in the document of prior art discussed above.

In the following description, the terms inner and outer refer to a positioning relative to the axis of rotation of an axial turbomachine. The axial direction is along the axis of rotation, and the radial direction is perpendicular to the axial direction. The lateral direction is to be considered along the circumference.

FIG. 1 represents a double-flow turbojet engine 2. The turbojet engine 2 comprises a low-pressure compressor 4, a high-pressure compressor 6, a combustion chamber 8 and a turbine 10. In operation, the mechanical power of the turbine 10 transmitted via the central shaft to the rotor 12 sets in motion the two compressors 4 and 6.

The compressors have several rows of rotor blades associated with rows of stator vanes. The rotation of the rotor about its axis of rotation 14 thus makes it possible to generate a progressively compressed air flow to the combustion chamber 8.

A fan 16 is coupled to the rotor 12 via a gearbox 13 and generates a stream of air which splits into a primary stream 18 and a secondary stream 20. The primary 18 and secondary 20 streams are annular flows, they are channeled by the ferrules, which may be internal ferrules and/or external ferrules.

Figure 2:
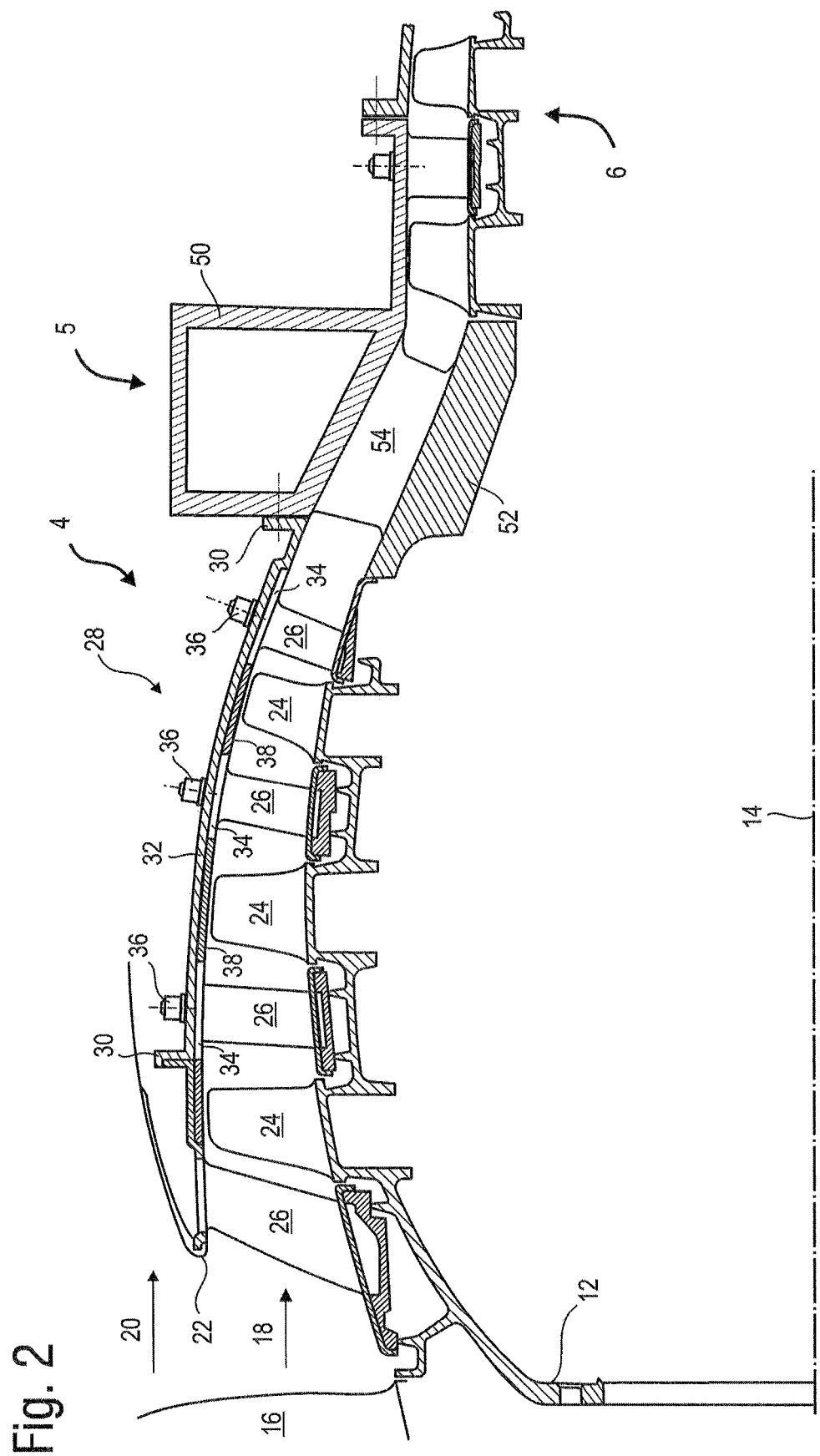
FIG. 2 is a diagram of a turbomachine compressor.

FIG. 2 is a sectional view of a compressor of an axial turbomachine such as that of FIG. 1. The compressor may comprise a low-pressure compressor 4. There can be seen a part of the fan 16 as well as the separation nozzle 22 of the primary flow 18 and secondary flow 20. The rotor 12 may comprise several rows of rotor blades 24.

The low-pressure compressor 4 comprises at least one stator stage which contains an annular row of stator vanes 26. Each stator stage is associated with the fan 16 or a row of rotor vanes 24 to straighten the air flow.

The low-pressure compressor 4 comprises at least one casing 28. The casing 28 may have a generally circular or tubular shape. It can be an external compressor casing and can be made of composite materials. The casing 28 may comprise fixing flanges 30, for example annular fixing flanges 30 for fixing the separation nozzle 22 and/or for fixing to an intermediate fan casing of the turbomachine. The casing then provides a function of mechanical connection between the separation nozzle 22 and the intermediate casing 32. The casing also ensures a centering function of the nozzle 22 with respect to the intermediate casing, for example by means of its annular flanges. The annular flanges 30 may be composite and include attachment holes (not shown) to allow bolt attachment.

The casing 28 may comprise a generally circular wall 32 or circular arc, whose axial edges may be delimited by the flanges 30. The wall 32 may have a profile of revolution about the axis of rotation 14. The wall 32 may be made of material composite, with a matrix and a reinforcement. The wall 32 may have an ogival shape, with a variation of radius along the axis 14.

The stator vanes 26 extend essentially radially from the wall 32, at annular regions for receiving vanes. The stator vanes 26 each comprise a fixing platform 34, and possibly fastening pins 36 such as threaded rods. The wall may comprise annular layers of abradable material 38 between the platforms 34 of the blades.

With composite materials, the housing 28 can be between 3 and 5 mm thick for a diameter greater than 1 meter.

Downstream of the low-pressure compressor 4 is a high-pressure compressor 6. The operation of the high-pressure compressor 6 is similar to the low-pressure compressor 4.

Between the two compressors 4, 6 is provided a bearing structure or structural casing 5. This casing 5 comprises an outer ring 50, an inner hub 52 and struts 54. The struts 54 extend in the air flow. The outer ring 50 and the inner hub 52 respectively have an outer and inner surface for guiding the flow.

The casing 5 may be provided with an upstream and/or downstream flange for connection with the compressors. The stator vanes of the compressors 4 and 6 may be of variable orientation. The downstream flange of the casing 5 may extend in axial superposition of the stator vanes with variable orientation of the compressor 6 and thus carry the actuation and the bearings of said blades. As described in FIG. 2, an annular row of rotor blades of the compressor 6 may optionally be interposed axially between the struts and such a row of stator blades with variable orientation.

Figure 3:
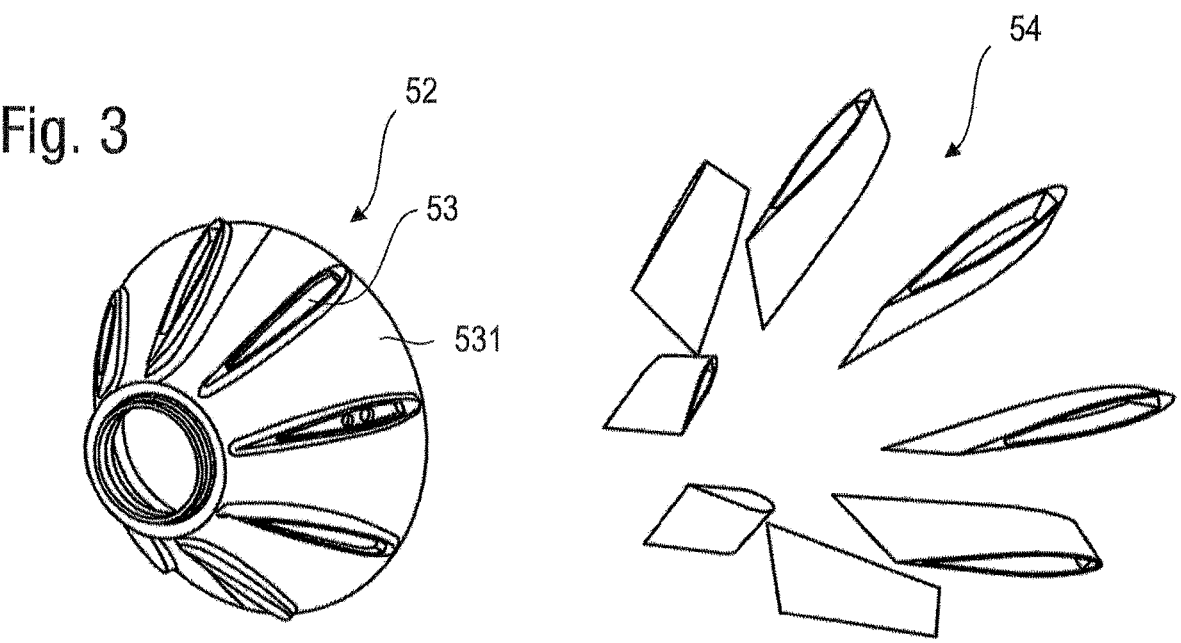
FIG. 3 outlines a kit according to the present application.
Figure 3:
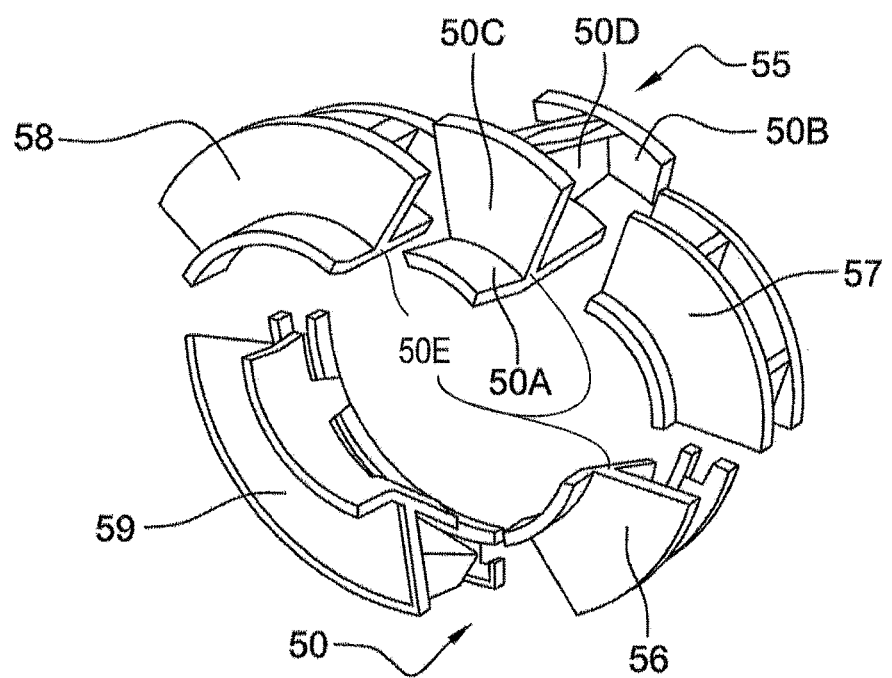

FIG. 3 further describes the structural casing 5. In this preferred embodiment, the inner hub 52 is in one piece and has a substantially conical outer surface 531. The diameter of the hub upstream (left side of the piece 52 in FIG. 2) is larger than its downstream diameter.

The outer surface 531 may be curved, or even with a point of inflection, so that the vein traversed by the air flow in the structural housing 5 looks like a "gooseneck". The outer surface 531 can also be a cone.

The inner hub 52 can be provided with recesses 53, in the form of a wing-profile projecting from the outer surface 52. These recesses can receive the struts 54 to be welded to the outer surface of the hub 52.

The struts 54 are preferably regularly angularly distributed around the inner hub 52.

The outer ring 50 is composed of several angular segments, preferably five segments marked 55 to 59. Each segment can be monobloc, and in particular a casted part.

Each segment (55-59) may comprise an axial portion 50A intended to delimit the primary flow of the turbomachine. Each axial portion 50A can essentially extend axially and circumferentially. Each axial portion 50A may form an angular arc of tubular wall around the axis of rotation of the turbomachine, or at least around the axis of symmetry of the housing.

Each segment (55-59) may comprise at least one radial partition, possibly two radial partitions. For example, the radial partitions may comprise an upstream partition 50B and a downstream partition 50C. Each radial portion (50B; 50C) can essentially extend radially and circumferentially. At least one or each radial partition (50B; 50C) can extend radially from the axial partition 50C of the corresponding segment.

Each segment may include a radial extension 50D. Each radial extension 50D can radially extend a strut. Each radial extension 50D may extend radially from an axial portion 50A, and/or axially connect the radial partitions (50B; 50C).

Each segment has two contact surfaces 50E that are flat and adapted to come into contact with contact surfaces 50E of adjacent segments.

The various parts of the casing are assembled by welding, for example laser or electron beam welding.

Each of the parts can be made of a different material and the skilled person could adapt the type of welding technology depending on the materials involved.

Figure 4:
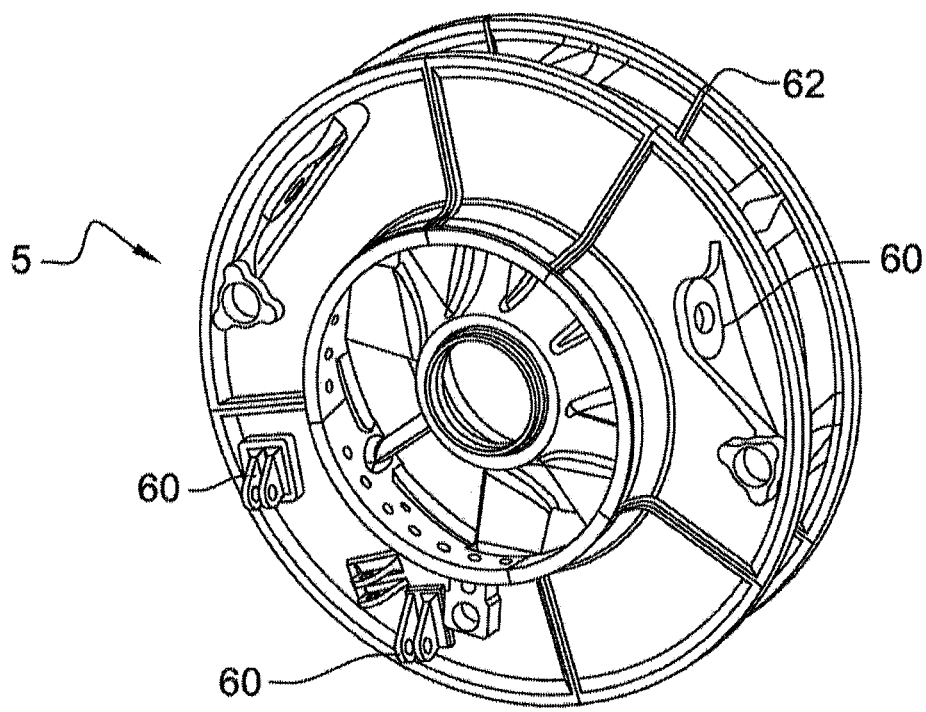
FIG. 4 illustrates an isometric view of the casing according to the present application.

FIG. 4 shows an isometric view of the casing 5, once all components are assembled, seen from a downstream position.

Some of the angular segments, especially the largest, include attachment rings 60 for handling the casing during assembly of the turbomachine, or during a maintenance operation. These attachment rings 60 can also serve to fix the casing to an aircraft pylon (not shown). Attachment rings 60 may comprise main rings, and possibly auxiliary rings. The main rings can be arranged in the upper half of the casing 5. The main rings can be formed through main fixing flanges.

The main attachment rings may be separated by at least one, possibly by at least two inter-segment welds 62. Each inter-segment weld 62 may be disposed between two successive struts 54.

Figure 5:
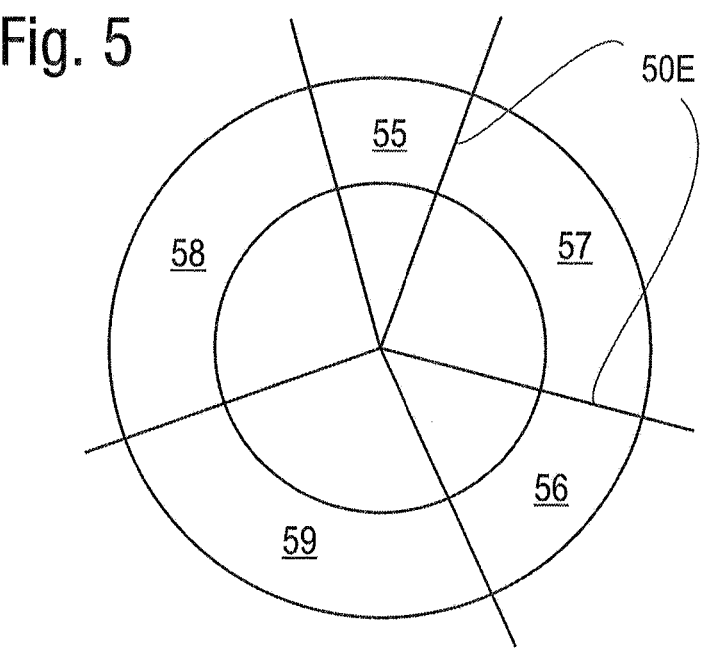
FIG. 5 shows a diagram of the outer ring.

FIG. 5 shows an example of the different angles that the angular segments can have. The segments are arbitrarily numbered in ascending order of the angle they have. Thus, the smaller segment 55 describes an angle of about 40°. Segment 56 describes an angle of 45°. The segments 57, 58 and 59 respectively describe angles of 90°, 90° and 95°.

According to an embodiment of the present application which is not illustrated, the inner hub 52 can also be an assembly of angular parts, of geometries (angles of each parts) similar to or different from the angular segments of the outer ring. The angular parts forming the hub may have contact surfaces aligned with, or angularly offset with respect to, the contact surfaces 50E of the outer ring.

According to one embodiment of the present application which is not illustrated, the structural casing 5 is an intermediate casing between a high-pressure turbine and a low-pressure turbine. A casing of substantially similar design, with the struts aerodynamically oriented opposite to what is described in FIG. 3, may be used.

The various details of the different embodiments set forth in the present application may be combined unless it is explicitly described as alternatives and such a combination is mechanically impossible.

We claim:

1. A structural casing for an axial turbomachine, the casing comprising:
   an outer ring;
   an inner hub; and
   a plurality of struts extending radially from the inner hub to the outer ring, the outer ring being made of a plurality of angular segments welded to each other, and each segment of the plurality of angular segments being welded to at least one strut of the plurality of struts;
   wherein at least two of the angular segments extend angularly of different angles.

2. The structural casing according to claim 1, wherein the at least two of the angular segments extend of two respective angles, one of which being at least twice the other one.

3. The structural casing according to claim 1 wherein the plurality of angular segments comprises:
   exactly three angular segments, one of which extending angularly over between 80° and 100°.

4. The structural casing according to claim 1, wherein the plurality of angular segments comprises:
exactly four angular segments, one of which extending angularly over more than 90°.

5. The structural casing according to claim 1, wherein the plurality of angular segments comprises:
at least five angular segments, the at least five angular segments comprising:
at least three large angular segments, each of them extending angularly over between 80° and 100°; and
at least two small angular segments, each of them extending angularly over between 30° and 60°.

6. The structural casing according to claim 5, wherein at least one of the at least three large angular segments is arranged angularly between two of the at least two small angular segments.

7. The structural casing according to claim 5, wherein at least one of the at least three large angular segments is provided with an attachment ring for attaching the casing to a pylon of an aircraft wing.

8. The structural casing according to claim 1, wherein the plurality of angular segments comprises:
two angular segments made of different material.

9. The structural casing according to claim 1, wherein each of the struts comprises:
an internal end welded to the inner hub and an external end welded to the outer ring.

10. The structural casing according to claim 1, wherein at least one fastening flange is provided integral to the angular segments.

11. The structural casing according to claim 1, wherein the inner hub is made of a plurality of angular parts.

12. The structural casing according to claim 1, wherein the struts are hollow.

13. A method for manufacturing a structural casing for an axial turbomachine, the structural casing comprising:
an outer ring;
an inner hub; and
a plurality of struts extending radially from the inner hub to the outer ring; the method comprising a welding step wherein a plurality of angular segments are welded to each other to form the outer ring, and each angular segment of the plurality of segments is welded to at least one strut of the plurality of struts;
wherein the inner hub and the struts are a one-piece cast part.

14. The method according to claim 13, wherein the struts are distributed angularly irregularly.

15. A structural casing for an axial turbomachine, the casing comprising:
an outer ring;
an inner hub; and
a plurality of struts extending radially from the inner hub to the outer ring, wherein the outer ring is made of a plurality of angular segments welded to each other, and welded to the struts, the plurality of angular segments having contact surfaces where the angular segments join each other;
wherein the inner hub is made of a plurality of angular parts, welded to each other, and welded to the struts, the plurality of angular parts having contact surfaces where the angular parts join each other; and
wherein at least one contact surface of one of the angular segments is arranged at a circumferential position that differs from all the contact surfaces of the angular parts.

16. The structural casing according to claim 15, wherein the inner hub comprises:
an external surface with recesses for receiving the struts.

17. The structural casing according to claim 16, wherein the external surface is conical.

18. The structural casing according to claim 15, wherein at least two of the angular segments extend angularly of different angles.

19. The structural casing according to claim 18, wherein the at least two of the angular segments extend of two respective angles, one of which being at least three times the other one.

20. The structural casing according to claim 18, wherein the plurality of angular parts comprises:
at least three large angular parts, each large angular part extending angularly over between 80° and 100°; and
at least two small angular parts, each small angular part extending angularly over between 30° and 60°.

* * * * *